United States Patent [19]

Kume

[11] Patent Number: 4,538,261

[45] Date of Patent: Aug. 27, 1985

[54] CHANNEL ACCESS SYSTEM

[75] Inventor: Hiroshi Kume, Kanagawa, Japan

[73] Assignee: Fuji Xerox Co., Ltd., Tokyo, Japan

[21] Appl. No.: 509,007

[22] Filed: Jun. 29, 1983

[30] Foreign Application Priority Data

Jun. 29, 1982 [JP] Japan .................................. 57/110593

[51] Int. Cl.³ .............................................. H04J 3/02
[52] U.S. Cl. ..................................... 370/85; 340/825.5
[58] Field of Search ................... 370/85, 94; 340/825.5

[56] References Cited

U.S. PATENT DOCUMENTS

| | | | |
|---|---|---|---|
| 4,063,220 | 12/1977 | Metcalfe et al. | 340/825.5 |
| 4,149,144 | 4/1979 | Diefenderfer | 370/85 |
| 4,234,952 | 11/1980 | Gable et al. | 370/85 |
| 4,281,380 | 7/1981 | DeMesa, III et al. | 340/825.5 |
| 4,282,512 | 8/1981 | Boggs et al. | 340/825.5 |
| 4,342,995 | 8/1982 | Shima | 340/825.5 |
| 4,410,983 | 10/1983 | Cope | 370/94 |
| 4,412,326 | 10/1983 | Limb | 340/825.5 |
| 4,445,214 | 4/1984 | Reynolds et al. | 340/825.5 |

Primary Examiner—Douglas W. Olms
Assistant Examiner—Kenneth I. Rokoff
Attorney, Agent, or Firm—Sughrue, Mion, Zinn, Macpeak, and Seas

[57] ABSTRACT

In order to increase the speed at which a determination is made as to which of a number of competing stations will occupy a particular block, the blocks are divided into a plurality of time slots and the various stations transmit probe signals into the time slots. Each station transmits its probe signal with a particular probability, with the probabilities preferably differing between respective stations. The number of occupied blocks in each frame can be counted to determine a degree of congestion, and the probe signal probabilities can be adjusted in accordance with the degree of congestion. Also if the degree of congestion is low, stations can transmit their packet signals directly without first transmitting probe signals, and the probe signal procedure will be followed thereafter only if a packet collision occurs.

23 Claims, 8 Drawing Figures

CHANNEL ACCESS SYSTEM

BACKGROUND OF THE INVENTION

This invention relates to a packet switching digital signal communications system, and more particularly to a channel access system for allowing a station attempting transmission to establish the right of carrying out transmission on a communications cable such as a coaxial cable.

With the proliferation of electronic computers and the development of digital signal processing techniques, data communications for on-line data processing by combining of communications systems and data processing systems have become very important. Particularly for small scale communications systems such as private communications provided in government and municipal offices and private companies, packet switching communications systems using communications cables such as coaxial cables have attracted much public attention because of their high reliability and economic and transmission efficiency.

In a packet switching communications system, a communications cable for carrying out two-way transmission is laid in a research laboratory or the like, and a number of stations (personal stations) are connected to the cable. Then, a message divided into data blocks of, e.g., 1,000–2,000 bits is transmitted from each station. Addresses, serial numbers and other headers are added to the messages. According to such a communications system, the network itself is a passive transmission medium with no control function, and the control functions have been completely decentralized in the hands of the stations. Accordingly, each station gains access to a channel after confirming that the transmission line is idle and starts transmitting a message. Should a collision of packets occur during transmission, both stations stop their transmissions. The stations which have stopped their transmissions are allowed to attempt to transmit messages again after a random access time.

Since each station starts transmitting its data according to this communications system, packet collisions may frequently occur on any given transmission line. Consequently, there is a problem that the transmission delay time will not be constant. Also, the transmission system becomes unacceptable for real time transmission in which emphasis is placed on the time relationship between transmission and reception, such as in aural communications of an interface type. Naturally, this problem may be solved by providing a master station and by making each station secure the channel access in advance. However, such an arrangement may make it impossible to carry out data communications when the master station becomes inoperable, thus reducing system reliability.

In order to deal with these disadvantages, a digital signal transmission system called a Modified Ethernet system has been proposed. According to this system, by dividing a large frame periodically repeated on a time axis into a plurality of small frames, or blocks, each personal station is given a chance to carry out packet communication in any of the available blocks. In so doing, each station can use a vacant block on an equal footing and, when a station wishes to monopolize a particular block for a required period of time for signal transmission, a chance to transmit a signal each time the frame is repeated is periodically given to the station. In other words, real time transmission becomes possible.

FIG. 1 shows an arrangement of the signal frame according to the modified ethernet system. The frame periodically repeated on the time axis comprises N blocks #1–#N. Each block consists of various bit strings b1–b9 as follows:
  b1: rear guard time;
  b2: preamble;
  b3: address bits;
  b4: distance code bits;
  b5: control bits;
  b6: data bits;
  b7: check bits;
  b8: end flag; and
  b9: front guard time.

In this case, the bits b2–b5 and b7–b8 are required for a packet configuration and are generally called overhead (additional) bits. In addition, the two bit strings b1 and b9 each provide a guard time. The guard time is an idle bit to eliminate the partial overlapping of adjacent packets caused by the delay time when the packet in each block propagates along a coaxial cable. There are two kinds of guard bits, the rear guard time bits b1 for protecting a packet positioned in the rear of a bit string and the front guard time bits b9 for protecting a packet positioned in the front. The sum of the number of bits of the rear and front guard times b1 and b9 is assumed to be g bits, and the guard time (b1 +b9) is represented by tg.

FIG. 2 illustrates in block diagram form the essential components of a modified ethernet communications system. In this system, both ends of a coaxial cable 1 laid as a transmission line are connected to impedance matching terminations 2 having the same resistance as the characteristic impedance of the cable 1. Each station is connected to the coaxial cable 1 through a T connector (tap) $3_1$–$3_N$. These stations are basically of the same construction, and there is therefore shown the detailed configuration of only the station A connected to the T connector $3_1$.

Each station is equipped with user equipment 4 provided with a computer and a telephone. The user equipment 4 has a transmitter (encoder) 41 for transmitting digital signals in packets to the other stations, a receiver (decoder) 42 for receiving signals in packets sent by the other stations, a terminal control unit 43 for controlling a terminal unit, and so forth. The signals outputted from the transmitter 41 are temporarily stored in a transmission buffer memory 51 and are collectively read out at a preset time with a clock signal substantially equal to a transmission speed on the coaxial cable transmission medium. The signals read out are converted into predetermined packets by a transmission logic circuit 52. The signals are then sent to the coaxial cable 1 through the T connector $3_1$ after they have passed through a transmission buffer amplifier 53.

On the other hand, all packet signals being transmitted on the coaxial cable 1 are received by a reception buffer amplifier 54 through the T connector $3_1$. A reception logic circuit 55 selects only packets addressed to its own station from those received, and temporarily stores the selected packets in a reception buffer memory 56. The stored signals are continuously read out using the predetermined clock, to thereby obtain the reception output.

Signals are thus transmitted and received as described above, and the transmission clock used therein is generated by a transmission clock oscillator 57. A frame counter 58 divides the transmission clock to prepare frame timing and block timing signals 71 and 72 for specifying the frame timing. A transmission control circuit 59 controls the terminal control unit 43 using the received signals destined for its own station obtained from the reception logic circuit 55, and at the same time controls the transmission logic circuit 52 according to the instructions given by the terminal control unit 43. In addition, a collision detection circuit 61 examines whether a first packet signal transmitted in the block chosen by its own station has collided with a first packet of another station.

The collision of packets in the communications system will now be described in further detail. The user equipment 4 is provided with a block status memory (not shown) indicating which of the blocks #1-#N in the frame are occupied. Since the packet signals of each station are received by the reception buffer amplifier 54, the blocks being used can be registered on the basis of these received packet signals. In order to make possible real time transmission in the modified ethernet system, any station which has occupied a certain block is allowed to continuously occupy that block in the next frame. Accordingly, a station which desires transmission selects a vacent block indicated in the memory and sends a packet signal to that block in the next frame. However, if more than one station desires to start transmission at the same time, these stations will select the same vacant block, causing packet signals to be simultaneously generated. A collision will be produced at this time.

FIG. 3 illustrates such a state of collision. Assume that stations are arranged on the coaxial cable with the same relationship between them as that shown in FIG. 2. In other words, the stations A and C are arranged close to either end of the coaxial cable 1, whereas the station B is arranged between them. When the stations A and B attempt to start transmission simultaneously, these stations each expect to start transmitting packet signals to the Mth block #M ($1 \leq M \leq N$). In this case, the station A starts transmitting the packet signal P-A with the predetermined block timing. The packet signal P-A is received by the station B slightly later due to the propagation delay time on the coaxial cable, and still later by the station C. On the other hand, the packet signal P-B transmitted by the station B is sent out later by a predetermined period of time than the time at which the packet signal P-A is sent out. The reason for this is that packet signals are prevented from partially overlapping one another between the blocks by arranging the packet signals of adjacent blocks at a certain interval equivalent to the sum τg of the guard time at the middle point of the coaxial cable. The packet signal P-B is also received by the stations A and C after some respective 10 delays.

A collision detection circuit 61 at the station A detects the collision at the point of time that the packet signal P-B is received thereby. In concert with this detection, the transmission of the packet signal P-A is stopped halfway because, if more than one packet signal is mixed with another, it will contain no meaningful data. In the same way, the station B stops transmitting the packet signal P-B upon receiving the packet signal P-A. These stations each select a vacant block after some random access time, and each is allowed to transmit its packet signal again. At this time, the existing block #M is returned to an unused state thereafter, because each of the stations ceases to transmit a signal. The higher the frequency of transmission demand made in one communications system, the higher the probability that a plurality of stations will try to gain access to one and the same vacant block. In this case, the number of packet signal collisons increases, causing a delay in the establishment of a call, and the number of stations trying to retransmit their packet signals again increases and this results in an increase in the number of blocks at which collisions occur. In other words, the channel utilization ratio will be reduced, and a further disadvantage is that a period between the time the transmission demand is made and the time (transmission delay time) at which the transmission of a packet has been successful is increased.

SUMMARY OF THE INVENTION

In light of the above-described disadvantages, an object of the present invention is to provide a channel access system capable of effectively utilizing blocks and reducing transmission delay time.

According to the present invention, a plurality of small unit frames (slots) are provided in a block, so that a station trying to establish a call can transmit to the slot with certain probability a signal (probe signal) having a minimum required duration of time. Each station monitors the number of probe signals in that slot and, when one probe signal exists in one slot, the station which has transmitted the probe signal is allowed to occupy the block so as to establish the call. If a plurality of probe signals exist in one slot, the transmission of the probe signal will be repeated toward each slot with the predetermined probability until one probe signal exists in that slot to select a station. According to this channel access system, each station is given a number of chances of gaining channel access equivalent to the number of slots constituting a block. Accordingly, even when the transmission demand is high, the probability of establishing a call is increased, and the transmission delay time can be reduced.

BRIEF DESCRIPTION OF THE DRAWINGS

One preferred embodiment of the present invention will now be described in detail with reference to the accompanying drawings, in which.

DETAILED DESCRIPTION OF THE PREFERRED EMBODIMENT

Figure 1:
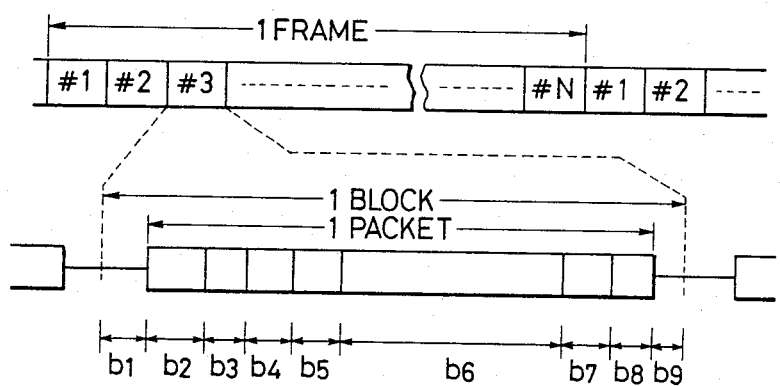
FIG. 1 illustrates a frame construction according to a conventional modified ethernet communications system.
Figure 2:
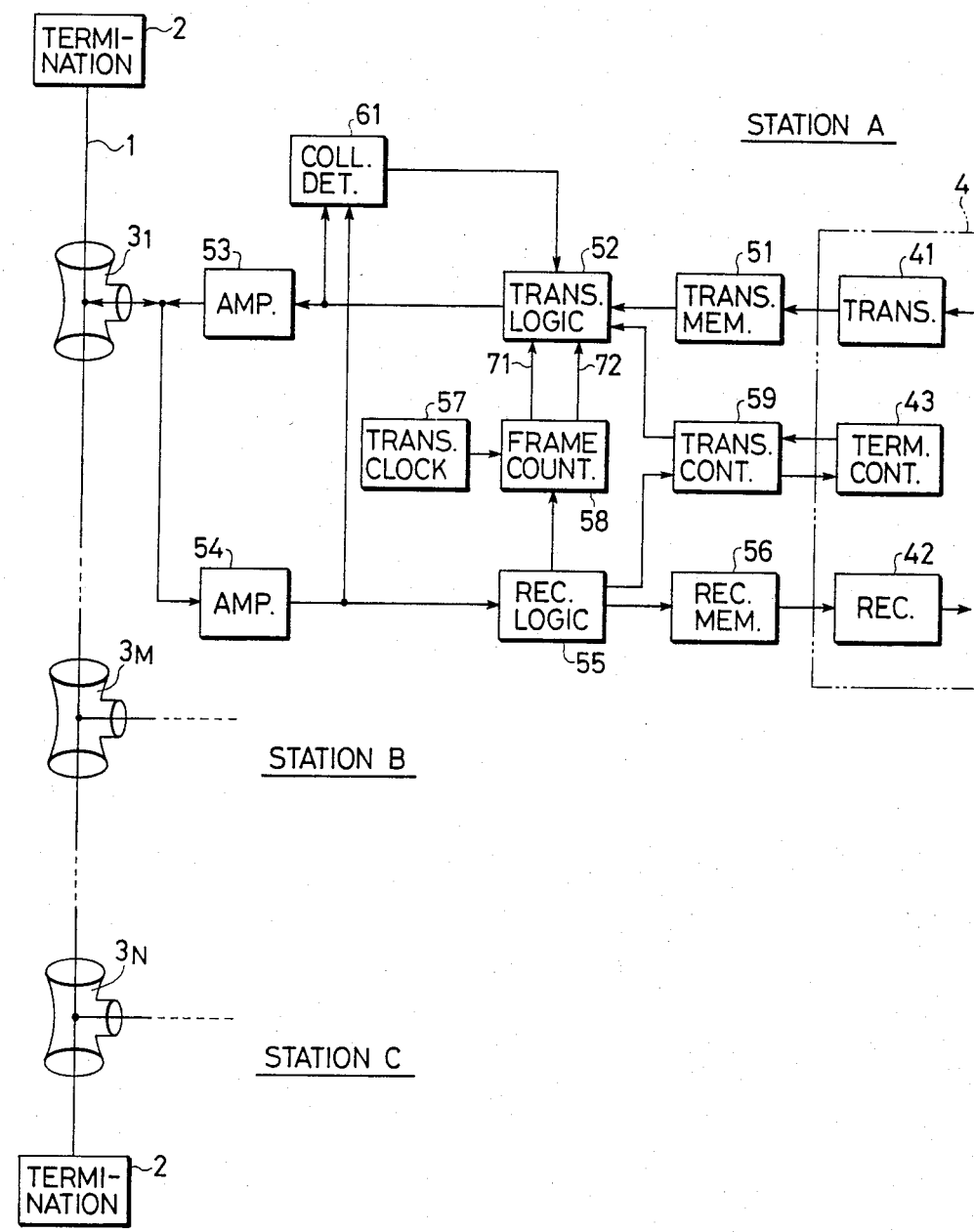
FIG. 2 is a block diagram outlining the conventional communications system.
Figure 3:
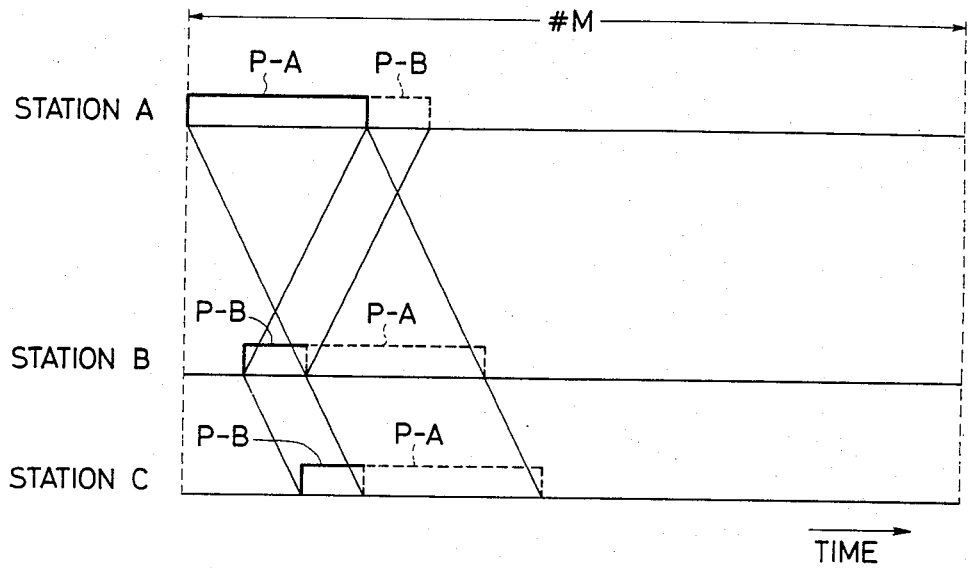
FIG. 3 is a timing chart illustrating the collision of blocks when channel access is carried out according to the conventional system.
Figure 4:
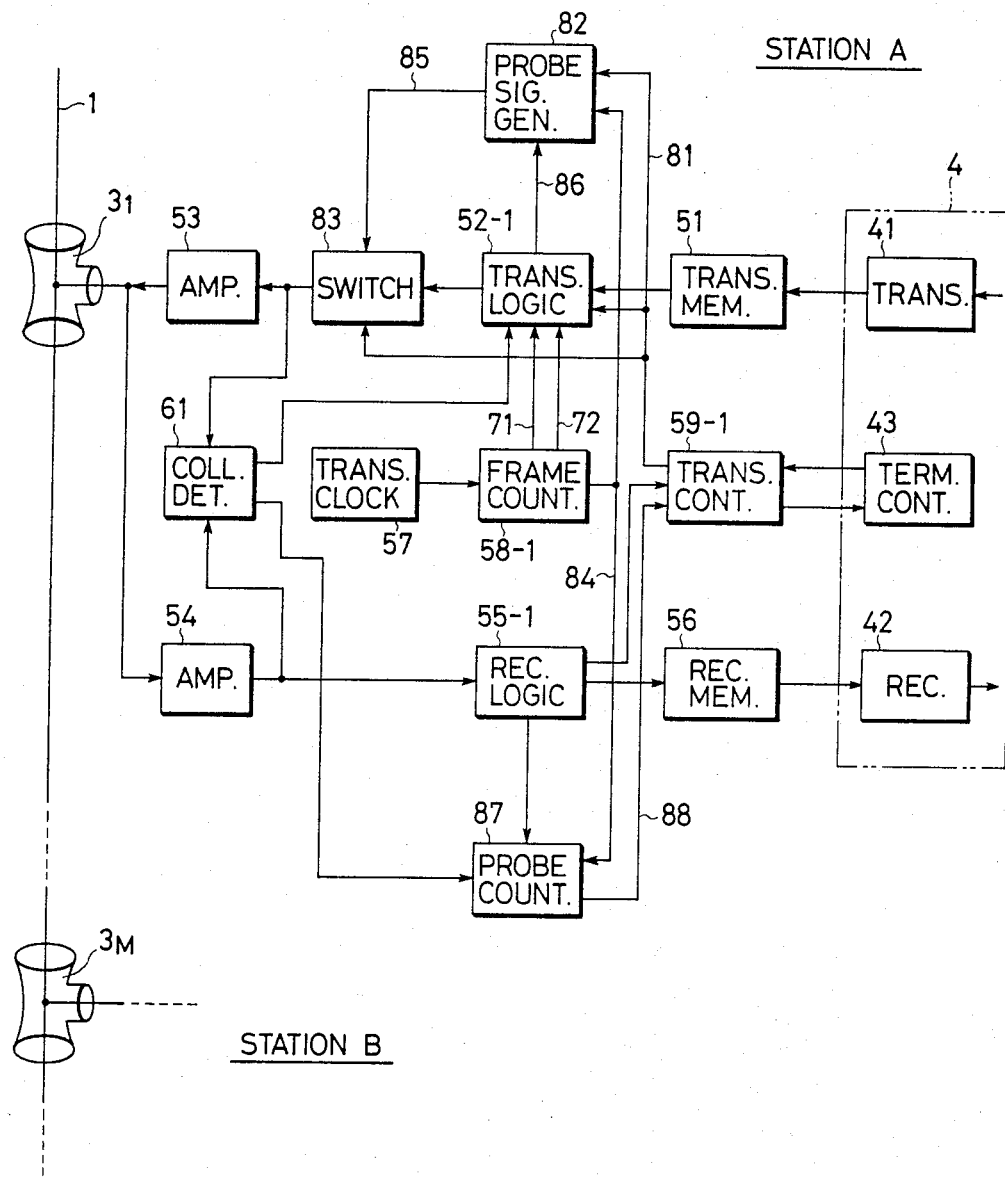
FIG. 4 is a block diagram outlining a communications system according to one preferred embodiment of the present invention.

FIG. 4 outlines the communications system according to a preferred embodiment of the present invention. Since each station connected to the coaxial cable 1 is basically of the same construction, the diagram illustrates the essential components of only the station A connected to the T connector $3_1$. This communications system is based on the modified ethernet system, and, for the same of simplification, like reference characters indicate like parts as in FIG. 2.

Assume that the user equipment 4 at the station A has made a transmission demand. In the above-mentioned memory in the user equipment 4, whether or not each of the blocks #1–#N in a frame is occupied has been registered. The terminal control unit 43 selects the vacant block #M which is the first vacant block detected after the transmission demand and would therefore make it possible to carry out transmission as quickly as possible after the transmission demand has been made, and notifies this fact to a transmission control circuit 59-1. The transmission control circuit 59-1 simultaneously supplies a signal 81 demanding the generation of a probe signal to a probe signal generator 82 and to a switch circuit 83, which causes its gate to be ON.

Figure 5:
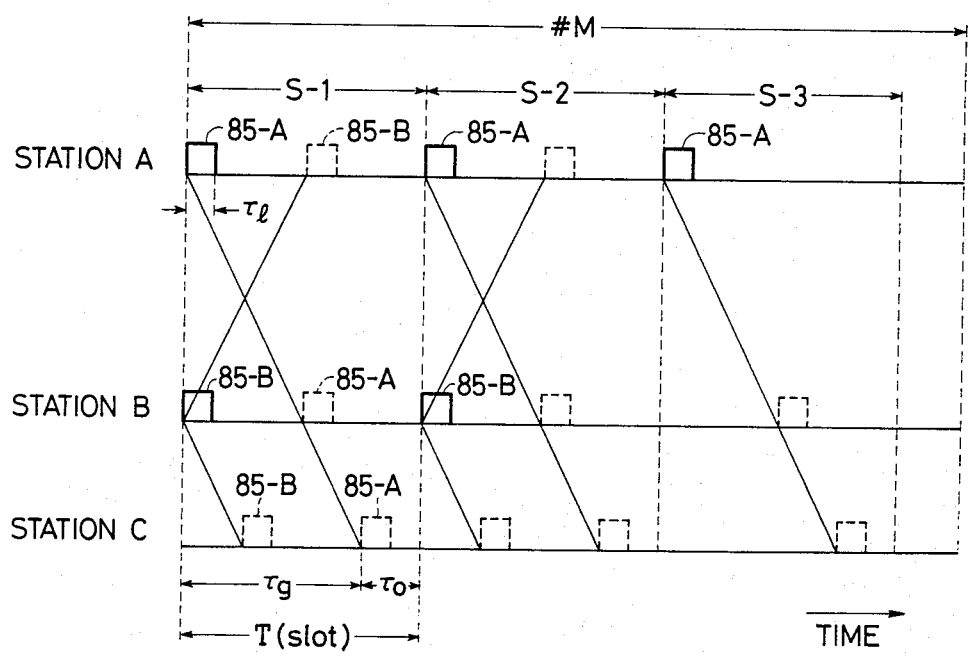
FIG. 5 is a timing chart illustrating the channel access operation according to the system.

On the other hand, a frame counter 58-1 divides a transmission clock supplied by the transmission clock oscillator 57 to prepare a slot timing signal 84 in addition to the frame timing signal 71 and the block timing signal 72. The frame timing signal 71 is used to provide each frame (large frame) and the block timing signal 72 to divide one frame into blocks (small frames) #1–#N. In contrast, the slot timing signal 84 is employed to divide one block into a plurality of slots. In this embodiment as shown in FIG. 5, one block (#M) is divided into three of the slot times S-1 through S-3. One period of the slot time T must satisfy the following relation:

$$T = \tau g + \tau o$$

where $\tau g$ is the above-described guard time, or propagation delay time between stations located farthest from one another on the coaxial cable. This is equivalent to the propagation delay time between the stations A and C in this embodiment. $\tau o$ is the time obtained by adding the time $\tau d$ required for the station to detect a carrier to the time $\tau s$ required to transmit a probe signal 85, and then by adding the sum to the length $\tau l$ of the probe signal 85; where $\tau d$ is the delay time caused between the T connector 3 and a reception logic circuit 55-1 of that station.

A transmission logic circuit 52-1 receives the frame timing signal 71 and the block timing signal 72 from frame counter 58-1 and, upon receiving data on the vacant block #M from the transmission control circuit 59-1, causes a transmission block instructing signal 86 to be generated with the timing at which the block #M is started. The probe generator 82 takes the logical product of the transmission block instructing signal 86 and the signal 81 demanding the generation of the probe. At a time corresponding to the start of the first slot time S-1 instructed by the slot timing signal 84, the probe generator 82 operates to generate the probe signal 85 with the constant probability assigned to the station A. By the probe signal 85 is meant a signal having a minimum required duration of time enabling each station to positively distinguish the signal even in the presence of noise and so on. When the probability $\alpha$ is 50%, for instance, there is a 50% probability that the probe signal 85 will be generated each time the slot timing signal 84 is generated.

Assume that a probe signal 85-A is generated at the first slot time S-1. The probe signal 85-A is sent to the coaxial cable 1 from the T connector $3_1$ through the switch circuit 83 and the transmission buffer amplifier 53. FIG. 5 illustrates this situation, and the probe signal 85-A is received by the stations B and C after the predetermined delay time. The reception logic circuit 55-1 will detect the probe signal 85 if it is contained in the received signal and make the probe counter 87 measure the signal. Accordingly, when the station A itself sends out the probe signal 85, the probe counter 87 will count at least this one signal.

Assuming that the stations B and C generate transmission demands almost simultaneously with the station A, the probe generators 82 at the stations B and C are made to generate the probe signals 85 with the probabilities $\beta$ or $\gamma$ at the first slot time S-1. The probabilities $\beta$ and $\gamma$ may be identical with the probability $\alpha$, or the probabilities may be determined individually in accordance with the importance of the station involved. As a result, if a probe signal 85-B is generated by the station B and if a probe signal 85-C is not generated by the station C, the probe signal 85-B will be received by station A after the predetermined delay time and counted by the probe counter 87. Since each station is equipped with the probe counter 87, similar counting operations are carried out therein. When the next slot timing signal 84 is supplied, a counted value 88 is outputted to the transmission control circuit 59-1 and then the contents of counter 87 are cleared.

The transmission control circuit 59-1 conducts the following operations depending on the counted value 88 received:

(1) At any station which has sent out the probe signal 85, when the counted value 88 of the probe signal 85 is 1 it is understood that the probe of only that station has been sent to the coaxial cable. In this case, the number of the block in which the probe has been sent out (the number of the block #M) is registered in the memory to indicate that block is now occupied. The control circuit 59-1 then controls the transmission logic circuit 52-1 to make it transmit a packet signal in the block #M of the next frame, i.e. a call is immediately established. When the counted value of the probe signal 85 is 2 or more at a station which has sent out its probe signal 85, it is uncertain which of the stations will be allowed to occupy the block. Accordingly, the signal 81 demanding the generation of the probe signal is again generated, and the above described operation related to the transmission of the probe signal 85 is repeated.

(2) For a station that has produced a probe signal generation demand signal but has not sent out the probe signal 85, such as station C in this example, when the counted value 88 of the probe signal 85 is 0, this station is given a chance to try to occupy this block by sending a probe signal into the next slot, since no other station has sent out the probe signal 85. In other words, the transmission control circuit 59-1 sends out the signal 81 demanding the generation of the probe. When the counted value of the probe signal 85 is 1 or more, this station gives up the competition to occupy that block and registers the block in its block status memory as one being used. Then the station attempts to gain access to another vacant block after a random access time.

(4) A station that has not generated the transmission demand will do nothing when the counted value of the probe signal 85 is 0. When the counted value of the probe signal 85 is 1 or more, the station registers the block in its block status memory as one being used.

Now, in the example shown in FIG. 5, the stations A and B have sent out the probe signals 85-A, 85-B at the first slot time S-1. Consequently, the station C retires, whereas the stations A and B will be given a chance to send out the probe signal 85 at the second slot time S-2. These stations again send out the probe signal 85 with the probabilities $\alpha$ and $\beta$, respectively.

Provided that both the stations send out the probe signals 85-A, 85-B, the probe counter 87 counts them and these stations will be given a chance to send out the probe signal 85 at the third slot time S-3. Provided that only the station A sends out the probe signal 85-A at the third slot time S-3, the station A is entitled to occupy the block #M. Even if a number of stations attempt to gain access to a block, they are screened at each slot time through competition, and the stations which will be allowed to occupy the block are determined with fairly high probability. In case no station has been selected at the final slot time of the block, a vacant block is looked for after the passage of a random access time and the channel access is repeated again in that block in the manner described above.

Figure 6:
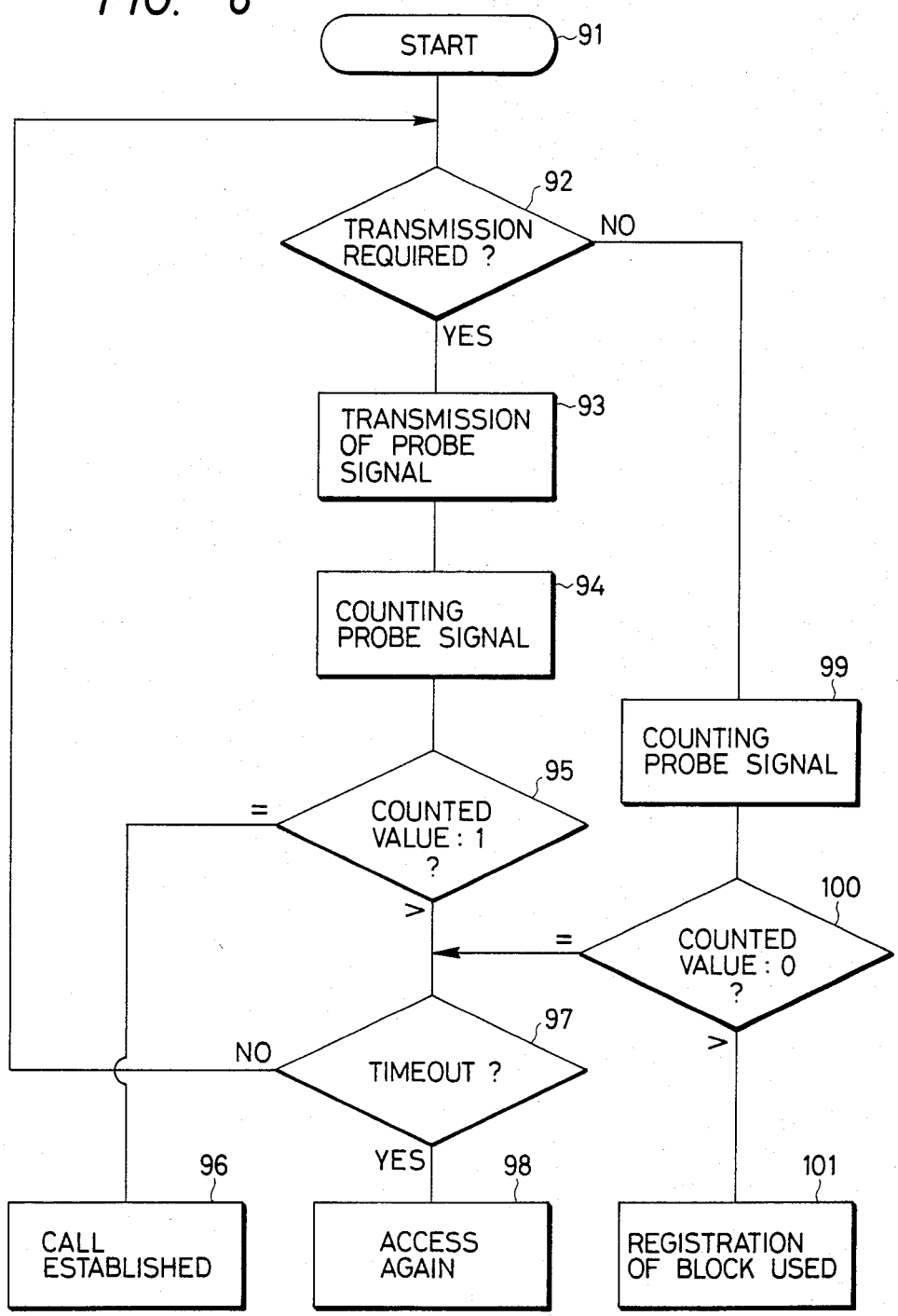
FIG. 6 is a flowchart illustrating the access method.

FIG. 6 illustrates the channel access system as described above from the viewpoint of the station demanding transmission. When the transmission demand is made by the controller 43 at step 91 (start), the station determines at step 92 whether to transmit a probe signal at a slot time with the predetermined probability. When the probe signal transmission is to be carried out (YES), the probe signal is transmitted at step 93 and the probe signal during one slot time is counted at step 94. The counted value is judged at step 95 to be equal to 1 or more than 1, and a call is established when it is 1. When the value is more than 1 and when it is not possible to send out the probe signal again in the block (step 97: YES), the channel access is again attempted at step 9 after a random access time. On the contrary, when it is possible to send out the probe signal again (step 97: NO), the transmission of the probe signal is again attempted.

On the other hand, another station, which desires transmission but which will not send out its probe signal due to its predetermined probability (step 92: NO), counts the probe signal during one slot time period at step 99 and is given a chance to gain channel access when the counted value is 0 (step 100). When the value is 1 or more (step 100), the station registers the block at step 101 as one being used.

Figure 7:
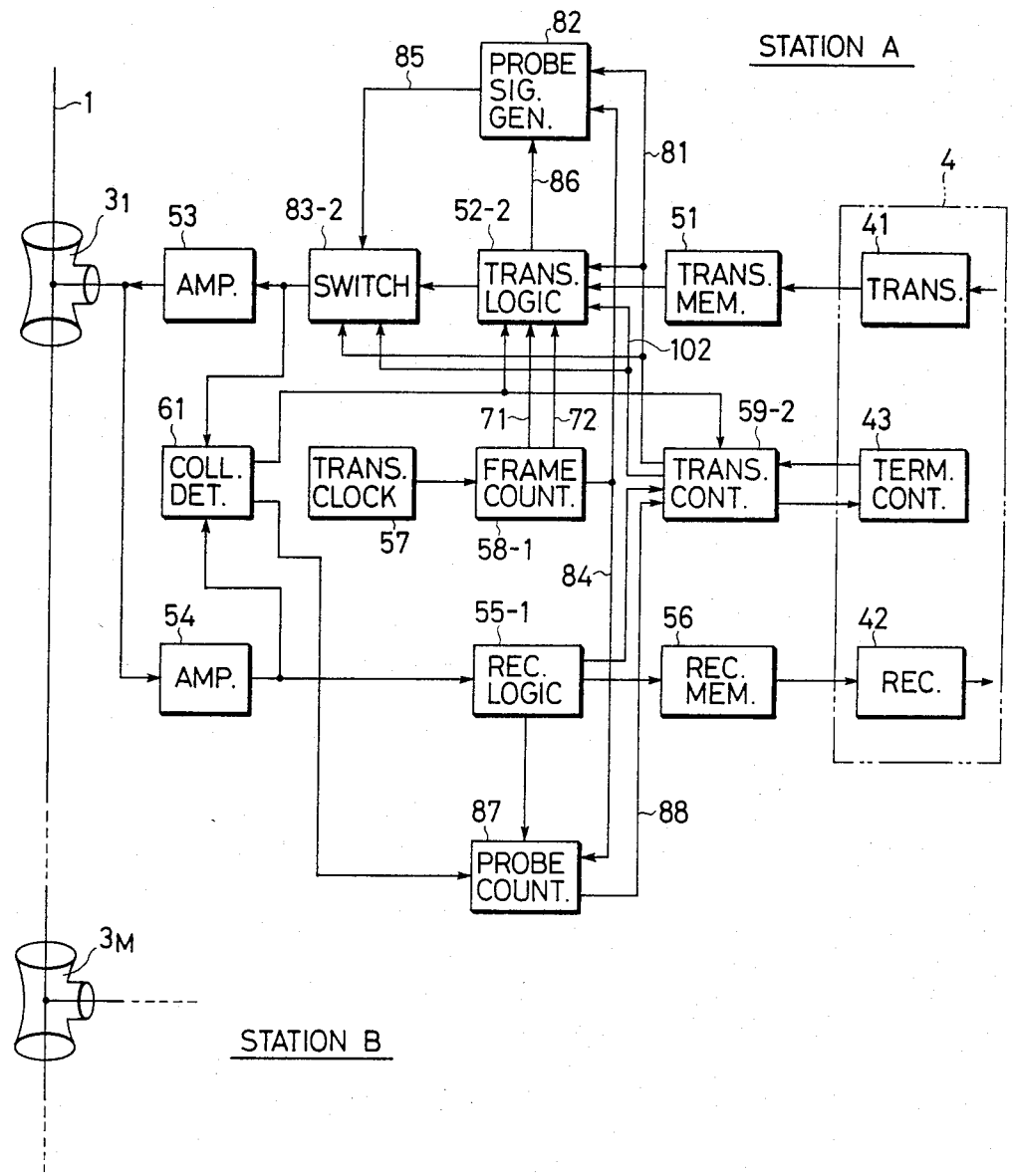
FIG. 7 is a block diagram outlining a communications system employing the channel access system as a transformed example.

FIG. 7 illustrates a first modification of the above-described channel access system. In a communications system adopting this system, each station connected to a coaxial cable is basically of the same construction. Therefore, the diagram shows the essential components of only the station A connected to the connector 31, and like reference characters indicate like parts in FIGS. 2 and 4 for the sake of simplification.

In the preceding embodiment, the probe signal 85 at each station is generated with certain probability when a transmission demand is made as shown in FIG. 6. However, once the probe signal 85 is sent to a vacant block, it will not be possible to start sending out a packet signal in that frame. In other words, because the probe signal 85 is different from the data to be transmitted, the station that has established monopolization of the block must wait and send out the packet signal in the same block of the next frame. Accordingly, when only a single station is attempting to gain access to a vacant block, the station could reduce transmission delay time by directly sending out its packet signal without sending out the probe signal 85.

In view of this fact, the second embodiment of FIG. 7 only employs the probe signal procedure if the circuit 61 first detects the collision of packet signals. For instance, when the transmission demand is generated in the user equipment 4 of the station A, a transmission control circuit 59-2 receives data as to the vacant block #M but will not output the signal 81 demanding the generation of the probe in this stage. Instead, the transmission control circuit 59-2 outputs a signal 102 demanding the transmission of a packet. The signal 102 demanding the transmission of the packet is supplied to a transmission logic circuit 52-2 and a switch circuit 83-2. The transmission logic circuit 52-2 reads the signal out of the transmission buffer memory 51 using the clock signal propagating at the transmission speed on the coaxial cable 1, and converts the read out signal into a predetermined packet signal before sending it to the switch circuit 83-2. The switch circuit 83-2 has its gate ON due to the signal 102 demanding the transmission of the packet, and the packet signal is sent out to the coaxial cable 1 through the switch circuit 83-2 and the transmission buffer amplifier 53.

Assuming that only the station A has sent out the packet signal to the block #M, the collision detection circuit 61 will not detect a packet signal collision. This data is also transferred to a transmission control circuit 59-2 as well as to the transmission logic circuit 52-2. The transmission control circuit 59-2 in this case outputs the signal 102 demanding the transmission of the packet, and monopolizes the block #M in each frame as long as it is required, causing the packet signal to be sent on a time sharing basis.

Assuming that another station B sends out a packet signal to the block #M of the same frame, the collision detection circuit 61 detects the collision. At the same time, the transmission logic circuits 52-2 at these stations cause their packet signals to stop. The transmission control circuit 59-2 stops transmitting the signal 102 demanding the transmission of the packet at this point of time and thereafter, and instead outputs the signal 81 demanding the generation of the probe. The transmission logic circuit 52-2, on receiving this signal 81, causes the transmission block instructing signal 86 to be outputted when the next slot timing signal 84 is generated, provided that more than one period of slot time remains in the rest of the block #M. In response to the signal 86, the probe signal 85 is generated by the probe generator 82 with the predetermined probability ($\alpha$ or $\beta$). If a station allowed to monopolize the block #M in the frame where the collision of packet signals has occurred is thus determined, the transmission of the packet signal will be started by the prevailing station beginning in the next frame.

On the other hand, if more than one period of slot time does not remain in the block #M of the frame in which the collision of packet signals has been detected, it is also possible to permit the station A to compete with the station B in the block #M of the next frame by means of the probe signal 85.

Figure 8:
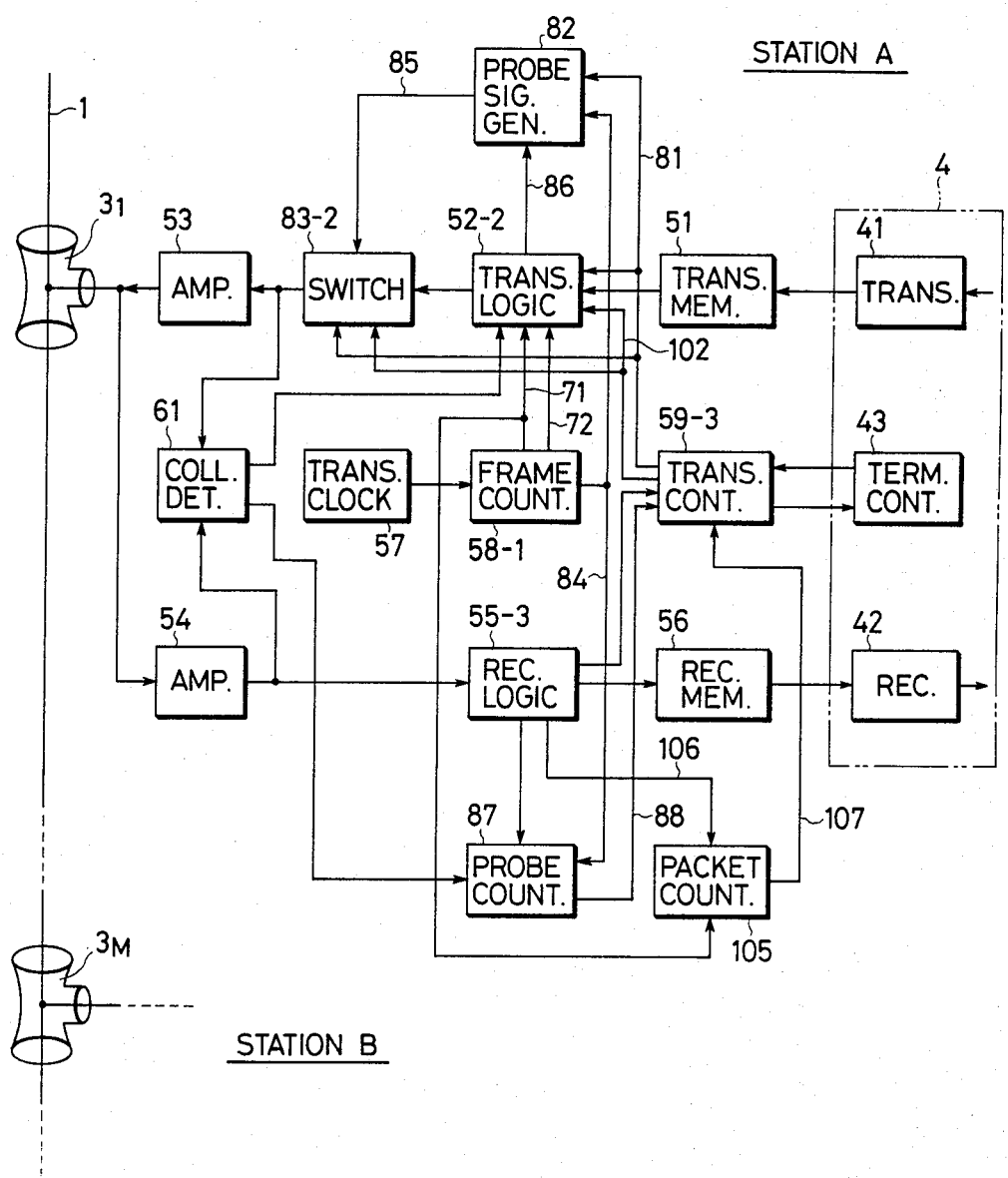
FIG. 8 is a block diagram outlining the communications system employing the channel access system as another transformed example.

FIG. 8 illustrates a second modification of the above-described channel access system. In a communications system adopting this system, each station connected to a coaxial cable is basically of the same construction. Therefore, the diagram shows the essential components of only the station A connected to the connector $3_1$, and like reference characters indicate like parts in FIGS. 2, 4 and 7 for the sake of simplification.

As in the case of the second embodiment of FIG. 7, the transmission of the probe signal 85 is controlled in a certain case also in this example. In this example, a packet signal is directly sent out to a vacant block when no channel congestion is detected, and a call is established through the probe signal 85 when the channel is congested so as to cause the packet signal to be sent out later.

In order to make the above operation possible, each station is equipped with a packet counter 105. The packet counter 105 receives the frame timing signal 71 from the frame counter 58-1 and clears its contents with the timing at which each frame starts. Each time a reception logic circuit 55-3 receives a packet being transmitted on the coaxial cable, the counter 105 receives a packet detection signal 106, thereby counting the number of packets in a frame. The counted result 107 for each frame is provided to a transmission control circuit 59-3. The transmission control circuit 59-3 compares the counted value 107 with the number X as a standard. When the counted value is larger than the number X, the signal 81 demanding the generation of the probe is generated when a transmission demand is made. Otherwise, the signal 102 demanding the transmission of the packet is outputted when the transmission demand is made.

The number X is smaller than the number of blocks in a frame and is relatively close to the latter. When the counted value is larger than the number X, the number of vacant blocks is relatively small. Accordingly, the danger of packet collision is high, so that the probe signal 85 is used to select the station. On the other hand, when the counted value is smaller than the standard value X, the number of vacant blocks is somewhat higher and the danger of packet collision is much less. Accordingly, since the danger collision of packets is low, the transmission of the packet signal is carried out directly without following the probe signal procedure. If the packet signals subsequently collide with each other, the transmission of the probe signal 85 may be adopted instead as in the case of the second embodiment, or these stations may be allowed to transmit their packet signals again.

Other possible modifications to the preferred embodiment of the present invention are as follows:

(i) In above-described examples, some stations fail to transmit the probe signal even if the transmission demand occurs, and those which do not make the transmission demand are so arranged that they are unable to gain access to the block in the next frame once they detect the probe signal sent out of another station. As already mentioned, this is to increase the possibility of establishing a call particularly when the number of stations making transmission demands is large. However, it may sometimes be effective to provide a channel access system permitting these stations to gain access to the above block in the next frame when a call has not been established in the frame to which the probe signal has been transmitted. In other words, when the number of stations that have made the transmission demand is relatively small, if the number of stations allowed to gain access is limited, it may result in the appearance of a slot time in which no station sends out its probe signal due to the probability of the occurrence of the probe signal, and this may result in unnecessary delay in the establishment of a call.

It is quite simple to allow the above-mentioned stations to gain access in the next frame. When more than one probe signal exists within one period of slot time, a chance to transmit the probe signal in the next frame is given to each station, including any that have newly made the transmission demand. Each of these stations is made to register the block in its block status memory as one being used when only one station sends out the probe signal with one slot timing. The advantage of the adoption of this modification is that, even if a station with greater probability of generating the probe signal at the first slot time fails to send out its probe signal, a call may be established with priority in the next frame and thereafter.

(ii) A second modification refers to a case in which a station expecting to continuously use a plurality of blocks has established a call. When such a station as this establishes a call in the first block in a number of continuous vacant blocks, it can easily monopolize these continuous vacant blocks without gaining access to each one of them. In other words, at the stage where the first block has been monopolized, this station is made to keep sending idle signals to the following blocks that it expects to use. Other stations detect the idle bits and register these blocks as ones being used, so that the station which has sent the idle bits can monopolize these blocks.

(iii) If this method of monopolizing the continuous vacant blocks is used, it may be possible to quickly establish a call by repeating the channel access method according to the present invention in these continuous blocks. This system is particularly effective when the establishment of a call is difficult within one block as a number of stations are attempting to gain access.

(iv) It is also possible to establish a call in the next vacant block through the same method without waiting for the next frame. In this case, by allowing the station selected in the prior block to send out a packet signal to the vacant block closest to the prior one from a time standpoint within the same frame, the advantage is that propagation delay time is further shortened.

(v) Finally, the probability of generating the packet counter and the probe signal as described in the second and third embodiments will be described. As has been made clear, the order of priority can be provided by assigning different probabilities to the probe signals of various stations. When the packet counter is installed in a communications system, the degree of congestion in a channel may be monitored, and the probe signal probability at each station can be adjusted. For instance, when the channel is extremely congested, the probability at all stations is reduced or the ratio of one probability to another is made greater to quickly establish a call. On the contrary, when there are a great deal of vacancies in the channel, it will be effective to raise the probability at all stations or make equal the probability at each station. According to the outputs of not only the packet counter but also the probe counter, the adjustment of the probability at the next slot time and thereafter is also effective.

As above described, the present invention, which is based on the modified ethernet system, is intended to allow each station to gain access with greater probability in the order that a transmission demand is made by providing a plurality of periods of slot time within one block. Consequently, it is highly probable that a call will be established within one block, whereas the channel utilization factor increases, thus shortening transmission delay time. Needless to say, since the advantages of the modified ethernet system have been introduced into the packet communications, the present invention also offers such advantages as a simple network in construction and high reliability.

What is claimed is:

1. A channel access system in a communication network of the type wherein a plurality of stations communicate with one another over a communication medium and wherein data signals on said medium are grouped into frames periodically occurring on a time axis, with each frame comprising a plurality of successively occurring blocks, each station including packet transmitting means for transmitting packet signals onto said medium to occupy a previously unoccupied block, whereby multiplexed digital signals are transmitted on said medium in a time division manner, said channel access system comprising:

means for dividing a first block into a plurality of time slots;

probe signal transmitting means at a particular station for transmitting a probe signal in one of said time slots when said particular station desires to transmit a packet signal in said first block; and monitoring means for monitoring said one time slot to count the number of probe signals occurring in said time slot and to determine if more than one probe signal occurs in said one time slot, whereby said particular station is given occupation of said first block in accordance with the number of probe signals counted in said one time slot.

2. A channel access system as claimed in claim 1, wherein said particular station is given occupation of said first block if said monitoring means counts only one probe signal in said one time slot.

3. A channel access system as claimed in claim 1, wherein said probe signal transmitting means transmits, with a predetermined probability X<100%, said probe signal during said one time slot when said paritcular station desires to transmit a packet in said first block.

4. A channel access system as claimed in claim 3, wherein each of said plurality of stations includes probe signal transmitting means for transmitting a respective probe signal with said predetermined probability, with the probability varying between stations.

5. A channel access system as claimed in claim 1, wherein said dividing means provides a division signal (84) corresponding to each time slot and wherein said channel access system further comprises means for generating a probe demand signal (81), said probe signal transmitting means transmitting said probe signal only when said division signal and probe demand signal are both generated.

6. A channel access system as claimed in claim 5, wherein said probe signal transmitting means only transmits, with a predetermined probability X<100%, said probe signal when said division and probe demand signals are both generated and also said particular station desires to transmit a packet in said first block.

7. A channel access system as claimed in claim 6, further comprising means for generating a vacant block signal at the beginning of said first block, said probe signal transmitting means only transmitting said probe signal when said vacant block signal is also generated.

8. A channel access system as claimed in claim 6, wherein when more than one probe signal transmitting means transmits with said predetermined probability said probe signal in a subsequent time in said first block.

9. A channel access system as claimed in claim 7, wherein, when more than one probe signal is detected in said one time slot, said probe signal transmitting means at said particular station transmits with said predetermined probability its probe signal in a subsequent time slot only if the probe signal from said particular station is one of the probe signals counted in said one time slot.

10. A channel access system as claimed in claim 1, wherein said transmitting means at said particular station transmits packet signals in response to a transmission demand signal, said system further comprising means responsive to said monitoring means output for generating said transmission demand signal when only one probe signal is counted in said one time slot.

11. A channel access system as claimed in claim 1, further comprising means for detecting the collision of packets from different stations in one block, said packet transmitting means transmitting packet signals in a previously unoccupied block when said particular station desires to transmit a packet signal, said probe signal transmitting means transmitting said probe signal only if a collision of packet signals has occurred when said particular station packet transmitting means has transmitted its packet signal.

12. A channel access system as claimed in claim 1, further comprising congestion detecting means for monitoring the degree of congestion determined by the number of occupied blocks compared to the total number of blocks in said communication medium, and, when said particular station desires to transmit a packet signal, said packet transmitting means transmitting said packet signal in said first block when the detected congestion is less than a predetermined level of congestion and said probe signal transmitting means transmitting said probe signal in said first block when the degree of congestion is greater than said predetermined level.

13. A channel access system as claimed in claim 12, wherein said congestion detecting means counts the number of blocks occupied in each frame, said predetermined level of congestion corresponding to a number of blocks less than the total number of blocks in a frame.

14. A channel access system as claimed in claim 13, wherein said congestion detecting means comprises packet detection means for detecting packets in each block, and counting means responsive to the output of said packet detection means for counting the number of blocks in which packets are detected.

15. A channel access system as claimed in claim 13, wherein said congestion detecting means comprises memory means at said particular station for storing indications as to the occupied or unoccupied status of each block, and counting means for counting the number of occupied blocks represented in said memory.

16. A channel access system as claimed in claim 1, further comprising means for counting the number of occupied blocks in a frame to determine a degree of congestion, and means for changing said predetermined probability in accordance with the degree of congestion.

17. A channel access system as claimed in claim 16, wherein said congestion detecting means comprises packet detection means for detecting packets in each block, and counting means responsive to the output of said packet detection means for counting the number of blocks in which packets are detected.

18. A channel access system as claimed in claim 16, wherein said congestion detecting means comprises memory means at said particular station for storing indications as to the occupied or unoccupied status of each block, and counting means for counting the number of occupied blocks represented in said memory.

19. A channel access system as claimed in claim 1, further comprising packet collision detecting means for detecting a collision of packet signals from plural stations in one block, said probe signal transmitting means at said particular station when a collision is detected, transmitting said probe signal only if the detected collision involved a packet signal from said particular station.

20. A channel access system as claimed in claim 1, further comprising packet collision detecting means for detecting a collision of packet signals from plural stations in one block, and means for counting the number of occupied blocks in a frame to determine a degree of congestion, said probe signal transmitting means at said particular station, when a collision is detected, transmitting said probe signal only if the detected collision involved a packet from said particular station or the degree of congestion exceeds a predetermined level.

21. A channel access system as claimed in claim 20, wherein said congestion detecting means comprises packet detection means for detecting packets in each block, and counting means responsive to the output of said packet detection means for counting the number of blocks in which packets are detected.

22. A channel access system as claimed in claim 20, wherein said congestion detecting means comprises memory means at said particular station for storing indications as to the occupied or unoccupied status of each block, and counting means for counting the number of occupied blocks represented in said memory.

23. A channel access system as claimed in claim 1, further comprising means at said particular station for transmitting a reserved signal, and wherein, when the amount of transmission desired by said particular station exceeds the transmission capacity of said first block, said reserved signal transmitting means transmits said reserved signal into at least one vacant block following said first block, and means at stations other than said particular station for detecting said reserved signal and for inhibiting said other stations from occupying said at least one succeeding block.

* * * * *